(12) United States Patent
Zhang

(10) Patent No.: US 10,609,682 B2
(45) Date of Patent: Mar. 31, 2020

(54) METHOD AND DEVICE IN UE AND BASE STATION USED FOR DYNAMIC SCHEDULING

(71) Applicant: Shanghai Langbo Communication Technology Company Limited, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 3 days.

(21) Appl. No.: 16/025,704

(22) Filed: Jul. 2, 2018

(65) Prior Publication Data
US 2019/0014554 A1   Jan. 10, 2019

(30) Foreign Application Priority Data
Jul. 6, 2017 (CN) .......................... 2017 1 0547264

(51) Int. Cl.
*H04W 72/04* (2009.01)
*H04W 72/14* (2009.01)
(Continued)

(52) U.S. Cl.
CPC .............. *H04W 72/04* (2013.01); *H04B 7/00* (2013.01); *H04B 7/0617* (2013.01);
(Continued)

(58) Field of Classification Search
CPC ............................ H04W 72/04; H04W 72/12
See application file for complete search history.

(56) References Cited

U.S. PATENT DOCUMENTS

| 10,278,168 B2* | 4/2019 | Bendlin | H04W 24/02 |
| 2018/0132243 A1* | 5/2018 | Yang | H04L 5/0092 |

(Continued)

FOREIGN PATENT DOCUMENTS

WO   WO-2018208211 A1 *  11/2018  ........... H04L 5/0053

OTHER PUBLICATIONS

R1-1707703, Hangzhou, PR china, May 15-19, 2017, Guangdong OPPO Mobile Telecom, "PDCCH CORESET configuration and UE procedure on NR-PDCCH" (Year: 2017).*

*Primary Examiner* — Maharishi V Khirodhar
(74) *Attorney, Agent, or Firm* — Maschoff Brennan

(57) ABSTRACT

The disclosure provides a method in a User Equipment (UE) and a base station for dynamic scheduling. The UE receives first information for determining X1 candidate resources and monitors second information that may occupy one of the X1 candidate resources. A first candidate resource is one of the X1 candidate resources. The first candidate resource includes a first Resource Element (RE) subset and a corresponding second RE subset. A time-frequency resource occupied by the second RE subset is related to a time-frequency resource occupied by the first RE subset. If the first candidate resource is occupied by the second information, the first RE subset and the corresponding second RE subset carry the outputs of two times of independent channel coding of the second information respectively. The number of REs included in the first RE subset is different from the number of REs included in the corresponding second RE subset.

20 Claims, 7 Drawing Sheets

(51) Int. Cl.
*H04W 72/12* (2009.01)
*H04L 5/00* (2006.01)
*H04B 7/00* (2006.01)
*H04L 1/00* (2006.01)
*H04B 7/06* (2006.01)
*H04L 27/26* (2006.01)

(52) U.S. Cl.
CPC ......... *H04B 7/0691* (2013.01); *H04L 1/0041* (2013.01); *H04L 1/0072* (2013.01); *H04L 5/00* (2013.01); *H04L 5/0007* (2013.01); *H04L 5/0044* (2013.01); *H04L 5/0053* (2013.01); *H04W 72/12* (2013.01); *H04L 1/0039* (2013.01); *H04L 1/0064* (2013.01); *H04L 27/2666* (2013.01)

(56) References Cited

U.S. PATENT DOCUMENTS

2018/0227074 A1* 8/2018 Sun .................. H04L 1/001
2018/0359755 A1* 12/2018 Sun .................. H04W 72/0453

\* cited by examiner

METHOD AND DEVICE IN UE AND BASE STATION USED FOR DYNAMIC SCHEDULING

CROSS REFERENCE TO RELATED APPLICATION

This application claims the priority benefit of Chinese Patent Application Serial Number 201710547264.2, filed on Jul. 6, 2017, the full disclosure of which is incorporated herein by reference.

BACKGROUND

Technical Field

The present disclosure relates to transmission methods and devices in wireless communication systems, and in particular to transmission schemes and devices for dynamically scheduling signaling.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary session decided to conduct the study of New Radio (NR). The work item of NR was approved at the 3GPP RAN #75 session to standardize the NR.

In order to adapt to access requirements of different User Equipment (UE) in high-frequency (more than 6 GHz) and massive-antenna deployment scenarios, the 3GPP RAN1 Adhoc #1701 session reaches a consensus on the design of a Physical Downlink Control Channel (PDCCH) utilizing massive antennas, that is, a UE can be configured on multiple Beam Pair Links (BPLs) to monitor the PDCCH, according to the capability of the UE. In this way, when one BPL fails to communicate or is degraded due to factors such as blocking or rotation, the PDCCH can be transmitted through other candidate BPLs. The simplest method for improving transmission reliability is to repeat transmitting the PDCCH on multiple configured BPLs.

SUMMARY

In the designs of PDCCH and Enhanced Physical Downlink Control Channel (EPDCCH) of the existing LTE, a UE performs blind detections on multiple candidates of different aggregation levels in a given search space to obtain Downlink Control Information (DCI). The maximum number of blind detections is restricted by the capability of the UE. Since the PDCCH in NR probably supports repeated transmission of DCI on multiple BPLs, the UE needs to perform multiple blind detections on multiple BPLs. This may increase the number of blind detections performed by the UE and thus may increase the complexity. If combing over multiple BPLs is supported for the DCI detection, the robustness of the DCI transmission and the detection rate could be greatly improved. However, the number of blind detections performed by the UE will probably be increased on the other hand.

In view of the design for search spaces of the PDCCH in NR, particularly the mapping of candidates in the search space(s), the present disclosure provides a solution. It should be noted that embodiments in the UE of the present disclosure and the characteristics in the embodiments may be applied to the base station if no conflict is incurred, and vice versa. Further, the embodiments of the present disclosure and the characteristics in the embodiments may be mutually combined if no conflict is incurred.

The present disclosure provides a method in a UE for wireless communication. The method includes the following steps:

receiving first information; and
monitoring second information.

Herein, the first information is used for determining X1 candidate resources, the second information may occupy one of the X1 candidate resources, a first candidate resource is one of the X1 candidate resources, the first candidate resource includes a first Resource Element (RE) subset and a corresponding second RE subset, and a time-frequency resource occupied by the second RE subset is related to a time-frequency resource occupied by the first RE subset; if the first candidate resource is occupied by the second information, the first RE subset and the corresponding second RE subset are used to carry the outputs of two times of independent channel coding of the second information respectively, the number of REs included in the first RE subset is different from the number of REs included in the corresponding second RE subset, the first RE subset includes a positive integer number of REs, and the second RE subset includes a positive integer number of REs.

According to one aspect of the present disclosure, the above method is characterized in that: the monitor of the second information assumes that the second information is transmitted by a first antenna port group on the first RE subset, and the monitor of the second information assumes that the second information is transmitted by a second antenna port group on the second RE subset; the first antenna port group includes a positive integer number of antenna ports, and the second antenna port group includes a positive integer number of antenna ports; the first antenna port group and the second antenna port group are different.

According to one aspect of the present disclosure, the above method is characterized in that: the first RE subset is one of the X1 candidate resources, the second RE subset is one of the X1 candidate resources, and there is no RE that belongs to both the first RE subset and the second RE subset.

According to one aspect of the present disclosure, the above method further includes:

receiving third information.

Herein, the third information indicates whether the monitor of the second information can assume that the second information is transmitted on both the first RE subset and the second RE subset.

According to one aspect of the present disclosure, the above method further includes:

Receiving fourth information.

Herein, the fourth information is used for determining the order in which the blind detections for the second information are performed on the first RE subset and the second RE subset.

According to one aspect of the present disclosure, the above method is characterized in that: a first bit block is obtained as the bit sequence output of encoding the second information by polar coding with a mother code length of M, P1 consecutive bits in the first bit block occupy the first RE subset, a second bit block occupies the second RE subset, the second bit block is generated by concatenating P2 consecutive bits in the first bit block and the first bit block together, P1 is a positive integer not greater than M, and P2 is a non-negative positive integer less than M, and M is a positive integral power of 2.

The present disclosure provides a method in a base station device for wireless communication. The method includes the following steps:

transmitting first information; and transmitting second information.

Herein, the first information is used for determining X1 candidate resources, the second information occupies one of the X1 candidate resources, a first candidate resource is one of the X1 candidate resources, the first candidate resource includes a first RE subset and a corresponding second RE subset, and a time-frequency resource occupied by the second RE subset is related to a time-frequency resource occupied by the first RE subset; if the first candidate resource is occupied by the second information, the first RE subset and the corresponding second RE subset are used to carry the outputs of two times of independent channel coding of the second information respectively, the number of REs included in the first RE subset is different from the number of REs included in the corresponding second RE subset, the first RE subset includes a positive integer number of REs, and the second RE subset includes a positive integer number of REs.

According to one aspect of the present disclosure, the above method is characterized in that: the monitor of the second information assumes that the second information is transmitted by a first antenna port group on the first RE subset, and the monitor of the second information assumes that the second information is transmitted by a second antenna port group on the second RE subset; the first antenna port group includes a positive integer number of antenna ports, and the second antenna port group includes a positive integer number of antenna ports; the first antenna port group and the second antenna port group are different.

According to one aspect of the present disclosure, the above method is characterized in that: the first RE subset is one of the X1 candidate resources, the second RE subset is one of the X1 candidate resources, and there is no RE that belongs to both the first RE subset and the second RE subset.

According to one aspect of the present disclosure, the above method further includes:

transmitting third information.

Herein, the third information indicates whether the monitor of the second information can assume that the second information is transmitted on both the first RE subset and the second RE subset.

According to one aspect of the present disclosure, the above method further includes:

transmitting fourth information.

Herein, the fourth information is used for determining the order in which the blind detections for the second information on the first RE subset and the second RE subset.

According to one aspect of the present disclosure, the above method is characterized in that: a first bit block is obtained as the bit sequence output of encoding the second information by polar coding with a mother code length of M, P1 consecutive bits in the first bit block occupy the first RE subset, a second bit block occupies the second RE subset, the second bit block is generated by concatenating P2 consecutive bits in the first bit block and the first bit block together, P1 is a positive integer not greater than M, and P2 is a non-negative positive integer less than M, and M is a positive integral power of 2.

The present disclosure provides a UE for wireless communication. The UE includes:

a first receiver module, to receive first information; and a second receiver module, to monitor second information.

Herein, the first information is used for determining X1 candidate resources, the second information may occupy one of the X1 candidate resources, a first candidate resource is one of the X1 candidate resources, the first candidate resource includes a first RE subset and a corresponding second RE subset, and a time-frequency resource occupied by the second RE subset is related to a time-frequency resource occupied by the first RE subset; if the first candidate resource is occupied by the second information, the first RE subset and the corresponding second RE subset are used to carry the outputs of two times of independent channel coding of the second information respectively, the number of REs included in the first RE subset is different from the number of REs included in the corresponding second RE subset, the first RE subset includes a positive integer number of REs, and the second RE subset includes a positive integer number of REs.

According to one aspect of the present disclosure, the above UE is characterized in that: the monitor of the second information assumes that the second information is transmitted by a first antenna port group on the first RE subset, and the monitor of the second information assumes that the second information is transmitted by a second antenna port group on the second RE subset; the first antenna port group includes a positive integer number of antenna ports, and the second antenna port group includes a positive integer number of antenna ports; the first antenna port group and the second antenna port group are different.

According to one aspect of the present disclosure, the above UE is characterized in that: the first RE subset is one of the X1 candidate resources, the second RE subset is one of the X1 candidate resources, and there is no RE that belongs to both the first RE subset and the second RE subset.

According to one aspect of the present disclosure, the above UE is characterized in that: the first receiver module further receives third information, wherein the third information indicates whether the monitor of the second information can assume that the second information is transmitted on both the first RE subset and the second RE subset.

According to one aspect of the present disclosure, the above UE is characterized in that: the first receiver module further receives fourth information, wherein the fourth information is used for determining the order in which the blind detections of the second information are performed on the first RE subset and the second RE subset.

According to one aspect of the present disclosure, the above UE is characterized in that: a first bit block is obtained as the bit sequence output of encoding the second information by polar coding with a mother code length of M, P1 consecutive bits in the first bit block occupy the first RE subset, a second bit block occupies the second RE subset, the second bit block is generated by concatenating P2 consecutive bits in the first bit block and the first bit block together, P1 is a positive integer not greater than M, and P2 is a non-negative positive integer less than M, and M is a positive integral power of 2.

The present disclosure provides a base station device for wireless communication. The base station device includes:

a first transmitter module, to transmit first information; and a second transmitter module, to transmit second information;

Herein, the first information is used for determining X1 candidate resources, the second information occupies one of the X1 candidate resources, a first candidate resource is one of the X1 candidate resources, the first candidate resource includes a first RE subset and a corresponding second RE subset, and a time-frequency resource occupied by the second RE subset is related to a time-frequency resource occupied by the first RE subset; if the first candidate resource is occupied by the second information, the first RE subset and the corresponding second RE subset are used to carry the outputs of two times of independent channel coding of the second information respectively, the number of REs included in the first RE subset is different from the number of REs included in the corresponding second RE subset, the first RE subset includes a positive integer number of REs, and the second RE subset includes a positive integer number of REs.

According to one aspect of the present disclosure, the above base station device is characterized in that: the monitor of the second information assumes that the second information is transmitted by a first antenna port group on the first RE subset, and the monitor of the second information assumes that the second information is transmitted by a second antenna port group on the second RE subset; the first antenna port group includes a positive integer number of antenna ports, and the second antenna port group includes a positive integer number of antenna ports; the first antenna port group and the second antenna port group are different.

According to one aspect of the present disclosure, the above base station device is characterized in that: the first RE subset is one of the X1 candidate resources, the second RE subset is one of the X1 candidate resources, and there is no RE that belongs to both the first RE subset and the second RE subset.

According to one aspect of the present disclosure, the above base station device is characterized in that: the first transmitter module further transmits third information, wherein the third information indicates whether the monitor of the second information can assume that the second information is transmitted on both the first RE subset and the second RE subset.

According to one aspect of the present disclosure, the above base station device is characterized in that: the first transmitter module further transmits fourth information, wherein the fourth information is used for determining the order in which the blind detections of the second information are performed on the first RE subset and the second RE subset.

According to one aspect of the present disclosure, the above base station device is characterized in that: a first bit block is obtained as the bit sequence output of encoding the second information by polar coding with a mother code length of M, P1 consecutive bits in the first bit block occupy the first RE subset, a second bit block occupies the second RE subset, the second bit block is generated by concatenating P2 consecutive bits in the first bit block and the first bit block together, P1 is a positive integer not greater than M, and P2 is a non-negative positive integer less than M, and M is a positive integral power of 2.

In one embodiment, the present disclosure mainly has the following technical advantages.

According to the present disclosure, the UE can support transmission of DCI on multiple BPLs without increasing the number of blind decodings. The robustness of the DCI transmission is improved.

According to the present disclosure, the UE can combine and then detect the DCIs transmitted on the multiple BPLs. The detection rate is improved and the robustness of the DCI transmission is further improved.

According to the present disclosure, in view of the features of polar coding, the DCIs transmitted on the multiple BPLs can be softly combined before channel decoding while ensuring the mother code length to be the same. The performance of the DCI transmission can be further improved.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

The technical scheme of the present disclosure is described below in further detail in conjunction with the drawings. It should be noted that the embodiments in the present disclosure and the characteristics of the embodiments may be arbitrarily combined if there is no conflict.

Embodiment 1

Figure 1:
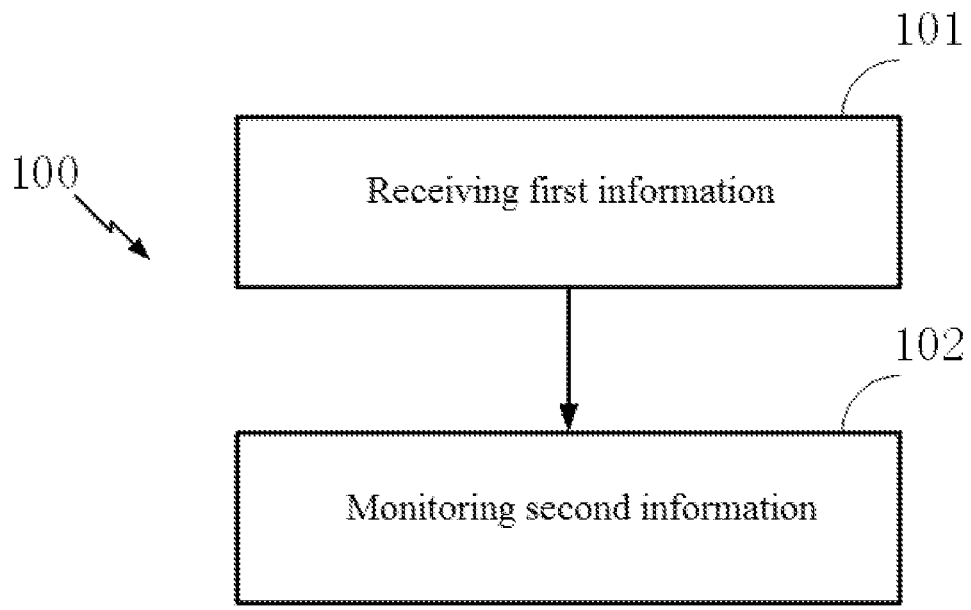
FIG. 1 is a flowchart illustrating the transmission of first information and second information according to one embodiment of the present disclosure.

Embodiment 1 illustrates an example of a flowchart of the transmission of first information and second information according to one embodiment of the present disclosure, as shown in FIG. 1. In FIG. 1, each box represents one step. In Embodiment 1, the UE in the present disclosure first receives first information and then monitors second information, wherein the first information is used for determining X1 candidate resources, the second information may occupy one of the X1 candidate resources, a first candidate resource is one of the X1 candidate resources, the first candidate resource includes a first RE subset and a corresponding second RE subset, and a time-frequency resource occupied by the second RE subset is related to a time-frequency resource occupied by the first RE subset; if the first candidate resource is occupied by the second information, the first RE subset and the corresponding second RE subset are used to carry the outputs of two times of independent channel coding of the second information respectively, the number of REs included in the first RE subset is different from the number of REs included in the corresponding second RE subset, the first RE subset includes a positive integer number of REs, and the second RE subset includes a positive integer number of REs.

In one embodiment, making the time-frequency resource occupied by the second RE subset related to the time-frequency resource occupied by the first RE subset can effectively reduce the number of times of the blind detection needed.

In one embodiment, the first information is high-layer information.

In one embodiment, the first information is carried by a Radio Resource Control (RRC) signaling.

In one embodiment, the first information is one Information Element (IE) of the RRC signaling.

In one embodiment, the first information is physical layer information.

In one embodiment, the first information is transmitted through a DCI.

In one embodiment, the second information is physical layer information.

In one embodiment, the second information is transmitted through a DCI.

In one embodiment, the second information is one field of the DCI.

In one embodiment, the second information is transmitted through a PDCCH.

In one embodiment, the second information is an output of channel encoding and rate matching of one DCI.

In one embodiment, the second information includes a positive integer number of bits.

In one embodiment, the first information is used by the UE to determine the X1 candidate resource.

In one embodiment, the first information indicates a first resource pool and determines the X1 candidate resources in the first resource pool according to a given pattern.

In one embodiment, the first information indicates the X1 candidate resources.

In one embodiment, two candidate resources of the X1 candidate resources include the same number of REs.

In one embodiment, any two candidate resources of the X1 candidate resources include different numbers of REs.

In one embodiment, one RE occupies one subcarrier in frequency domain and occupies one multi-carrier symbol in time domain.

In one embodiment, two candidate resources of the X1 candidate resources are orthogonal, wherein the two candidate resources being orthogonal refers that there is no RE belonging to both the candidate resources.

In one embodiment, two candidate resources of the X1 candidate resources are non-orthogonal.

In one embodiment, the UE determines in the X1 candidate resources the candidate resource occupied by the second information through a blind detection.

In one embodiment, the first candidate resource can be any one of the X1 candidate resources.

In one embodiment, the first candidate resource includes the first RE subset and the corresponding second RE subset only.

In one embodiment, the first candidate resource further includes REs other than the first RE subset and the corresponding second RE subset.

In one embodiment, the first RE subset and the second RE subset are orthogonal.

In one embodiment, the first RE subset and the second RE subset occupy different multi-carrier symbols in time domain.

In one embodiment, the number of REs included in the first RE subset is smaller than the number of REs included in the second RE subset.

In one embodiment, the number of REs included in the first RE subset is greater than the number of REs included in the second RE subset.

In one embodiment, the REs in the first RE subset are discrete in frequency domain.

In one embodiment, the REs in the first RE subset are consecutive in frequency domain.

In one embodiment, the REs in the second RE subset are discrete in frequency domain.

In one embodiment, the REs in the second RE subset are consecutive in frequency domain.

In one embodiment, the time-frequency resources occupied by the second RE subset can be uniquely determined through the time-frequency resources occupied by the first RE subset.

In one embodiment, a time-frequency resource occupied by a target RE subset group can be uniquely determined through the time-frequency resource occupied by the first RE subset, the second RE subset belongs to one RE subset of the target RE subset group, and the target RE subset group includes a positive integer number of RE subsets.

In one embodiment, the number of REs included in the first RE subset is used for determining a target RE subset group, a position of the first RE subset in the time-frequency domain is used for determining the second RE subset in the target RE subset group, the second RE subset belongs to one RE subset of the target RE subset group, and the target RE subset group includes a positive integer number of RE subsets.

In one embodiment, the number of REs included in the first RE subset is used for determining a target RE subset group, a position of the first RE subset in the time-frequency domain is used for determining the second RE subset in the target RE subset group, the second RE subset belongs to one RE subset of the target RE subset group, the target RE subset group includes a positive integer number of RE subsets, and the RE subsets in the target RE subset group include the same number of REs.

In one embodiment, the first RE subset belongs to one RE subset of an original RE subset group, the second RE subset belongs to one RE subset of a target RE subset group, the original RE subset group includes a positive integer number of RE subsets, the target RE subset group includes a positive integer number of RE subsets, the number of REs included in the first RE subset is used for determining the target RE subset group, and an index of the first RE subset in the original RE subset group is used for determining the second RE subset in the target RE subset group.

In one embodiment, the first RE subset belongs to one RE subset of an original RE subset group, the second RE subset belongs to one RE subset of a target RE subset group, the original RE subset group includes a positive integer number of RE subsets, the target RE subset group includes a positive integer number of RE subsets, the number of REs included in the first RE subset is used for determining the target RE subset group, and an index of the first RE subset in the original RE subset group is used for determining the second RE subset in the target RE subset group, the RE subsets in the original RE subset group include the same number of REs, and the RE subsets in the target RE subset group include the same number of REs.

In one embodiment, the channel coding is based on polar codes.

In one embodiment, the channel coding is based on convolutional codes.

In one embodiment, the channel coding is based on ⅓ tail biting convolutional codes.

In one embodiment, two times of independent channel coding refer that the two channel encoding processes are irrelevant.

In one embodiment, the outputs of two times of independent channel coding cannot be assumed as two consecutive parts of an output of one channel coding.

In one embodiment, two times of independent channel coding refer that the two channel coding processes both are started from an initial Redundancy Version (RV).

In one embodiment, the first RE subset carries a part of the output of channel coding of the second information.

In one embodiment, the first RE subset carries the entire output of channel coding of the second information.

In one embodiment, the second RE subset carries a part of the output of channel coding of the second information.

In one embodiment, the second RE subset carries the entire output of channel coding of the second information.

Embodiment 2

Figure 2:
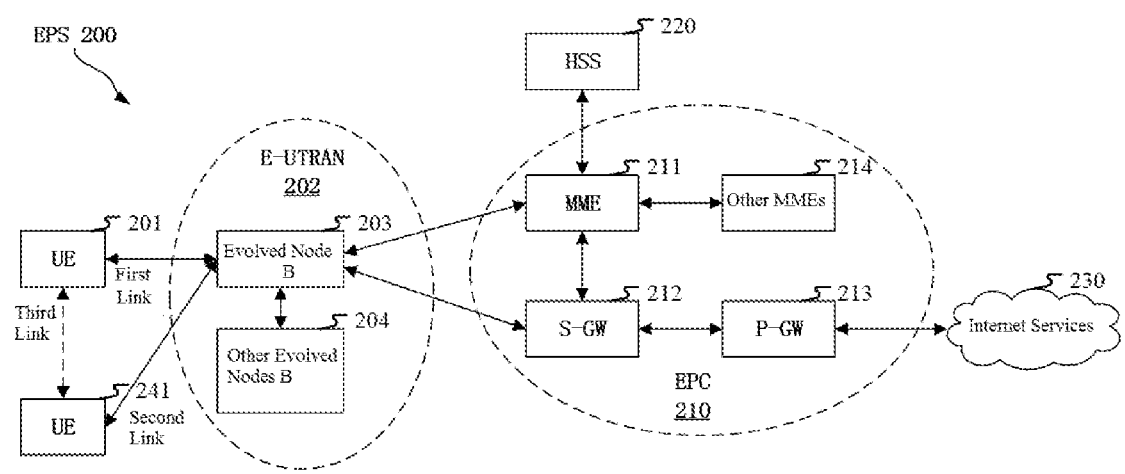
FIG. 2 is a diagram illustrating a network architecture according to one embodiment of the present disclosure.

Embodiment 2 illustrates an example of a diagram of a network architecture according to the present disclosure, as shown in FIG. 2. FIG. 2 is a diagram illustrating a system network architecture 200 of NR 5G Long-Term Evolution (LTE), Long-Term Evolution Advanced (LTE-A). The NR 5G or LTE network architecture 200 may be called an Evolved Packet System (EPS) 200. The EPS 200 may include one or more UEs 201, an NG-RAN 202, an Evolved Packet Core/5G-Core Network (EPC/5G-CN) 210, a Home Subscriber Server (HSS) 220 and an Internet Service 230. Herein, the EPS may be interconnected with other access networks. For simple description, the entities/interfaces are not shown. As shown in FIG. 2, the EPS provides packet switching services. Those skilled in the art are easy to understand that various concepts presented throughout the present disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client or other appropriate terms. The gNB 203 is connected to the EPC/5G-CN 210 via an SUNG interface. The EPC/5G-CN 210 includes an MME/AMF/UPF 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the internet service 230. The internet service 230 includes IP services corresponding to operators, specifically including internet, intranet, IP Multimedia Subsystems (IP IMSs) and Packet switching Streaming Services (PSSs).

In one embodiment, the UE 201 corresponds to the UE of the present disclosure.

In one embodiment, the gNB 203 corresponds to the base station of the present disclosure.

In one embodiment, the UE 201 supports multi-antenna communications.

In one embodiment, the UE 201 supports beam-forming based communications.

In one embodiment, the gNB 203 supports beam-forming based communications.

Embodiment 3

Figure 3:
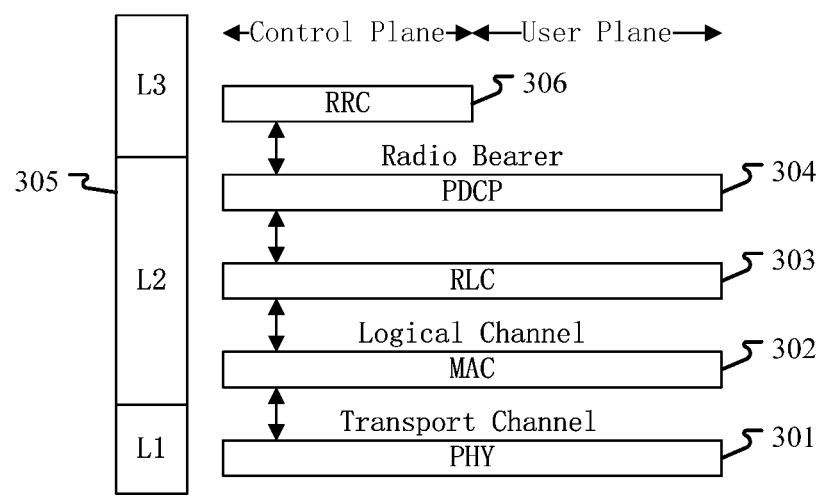
FIG. 3 is a diagram illustrating a radio protocol architecture of a user plane and a control plane according to one embodiment of the present disclosure.

Embodiment 3 is a diagram illustrating an embodiment of a radio protocol architecture of a user plane and a control plane according to the present disclosure, as shown in FIG. 3. FIG. 3 is a diagram illustrating an embodiment of a radio protocol architecture of a user plane and a control plane. In FIG. 3, the radio protocol architecture of a UE and a gNB is represented by three layers, which are a layer 1, a layer 2 and a layer 3 respectively. The layer 1 (L1) 301 is the lowest layer and performs signal processing functions of each PHY layer. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may include several higher layers above the L2 305, such as a network layer (i.e. IP layer) terminated at a P-GW of the network side and an application layer terminated at the other side of the connection (i.e. a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a lost packet to as to compensate the disordered receiving caused by Hybrid Automatic Repeat Request (HARQ). The MAC sublayer 302 provides multiplexing between logical channels and transport channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also includes a Radio Resource Control (RRC) sublayer 306 in the layer 3 (L3). The RRC sublayer 306 is responsible for acquiring radio resources (i.e. radio bearer) and configuring the lower layers using a RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station device in the present disclosure.

In one embodiment, the first information in the present disclosure is generated by the RRC 306.

In one embodiment, the second information in the present disclosure is generated by the PHY 301.

In one embodiment, the third information in the present disclosure is generated by the RRC 306.

In one embodiment, the fourth information in the present disclosure is generated by the RRC 306.

In one embodiment, the polar encoding in the present disclosure is executed by the PHY 301.

Embodiment 4

Figure 4:
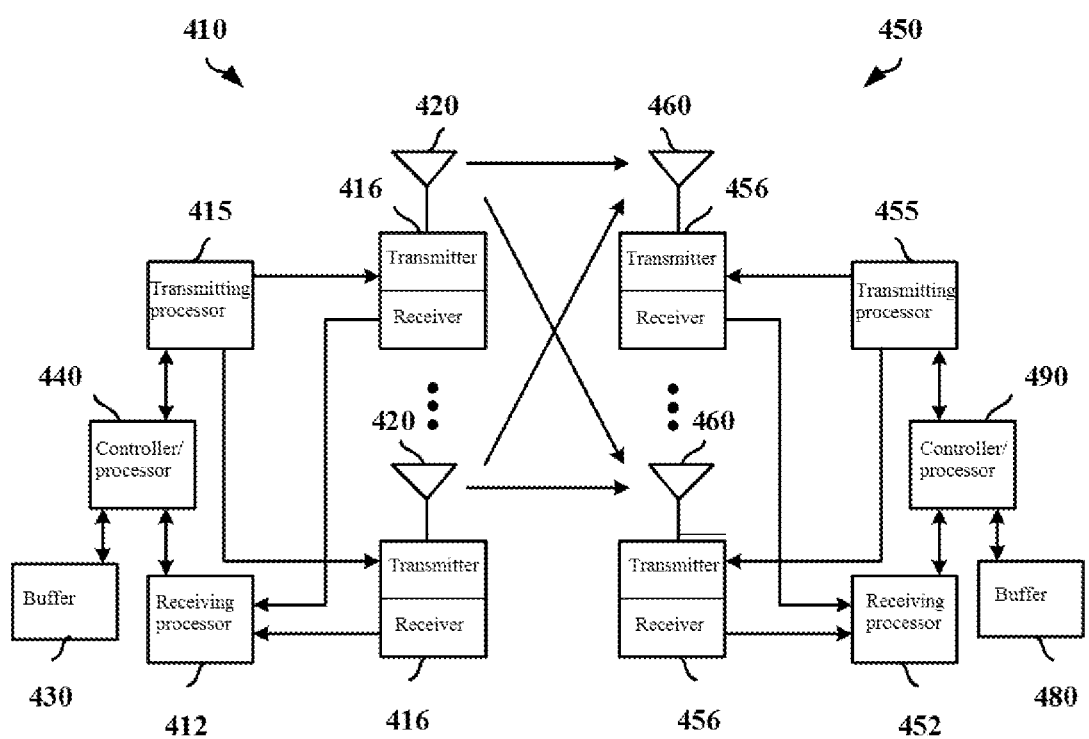
FIG. 4 is a diagram illustrating an evolved node B and a given UE according to one embodiment of the present disclosure.

Embodiment 4 illustrates a diagram of an evolved node B and a given UE according to the present disclosure, as shown in FIG. 4. FIG. 4 is a block diagram of a gNB 410 in communication with a UE 450 in an access network. In downlink transmission, a higher-layer packet coming from the core network is provided to a controller/processor 440. The controller/processor 440 provides functions of a layer 2. In downlink transmission, the controller/processor 440 provides header compression, encrypting, packet segmentation and reordering, multiplexing between a logical channel and a transport channel, and radio resource allocation for the UE 450 based on various priorities. The controller/processor 440 is also in charge of HARQ operation, retransmission of a lost packet, and a signaling to the UE 450. A transmitting processor 415 performs signal processing functions used for the layer 1. The signal processing function includes encoding and interleaving, so as to ensure an FEC (Forward Error Correction) and the mapping to signal clusters corresponding to each modulation scheme (i.e., BPSK, QPSK) at the UE 450 side. The encoded and modulated signals are divided into parallel streams. Each of the parallel streams is mapped into multi-carrier subcarriers and/or multi-carrier symbols (the first RE subset and second RE subset in the present disclosure carry multi-carrier symbol streams formed by different analog beams), and is multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. The parallel streams subject to spatial precoding to generate multiple spatial streams. Each spatial stream is provided to different antennas 420 via the transmitter 416. Every transmitter 416 is used to transmit a corresponding spatial stream modulation RF (Radio Frequency) carrier. At the UE 450 side, every receiver 456 receives a signal via a corresponding antenna 460. Every receiver 456 recovers information modulated to the RF carrier and provides the information to a receiving processor 452. The receiving processor 452 performs signal receiving processing functions of the layer 1. The receiving processor 452 performs spatial processing on the information to recover any spatial stream targeting the UE 450. The receiving processor 452 then converts the multi-carrier symbol stream from time domain into frequency domain using FFT. A frequency domain signal includes a single multi-carrier symbol stream for each subcarrier of multi-carrier signals. The symbol and reference signal on each subcarrier are recovered and demodulated by determining the most possible signal cluster point transmitted by the gNB 410, and generate a soft decision. The soft decision is then decoded and de-interleaved so as to recover the original data and control signal transmitted by the gNB 410 on the physical channel. The data and control signal are then provided to a controller/processor 490. The controller/processor 490 performs functions of the layer 2. The controller/processor can be connected to a memory 480 that stores program code and data. The memory 480 is a computer readable medium.

In one embodiment, the UE 450 includes at least one processor and at least one memory. The at least one memory includes computer program codes. The at least one memory and the computer program codes are configured to be used in collaboration with the at least one processor. The UE 450 at least receives first information and monitors second information, wherein the first information is used for determining X1 candidate resources, the second information may occupy one of the X1 candidate resources, a first candidate resource is one of the X1 candidate resources, the first candidate resource includes a first RE subset and a corresponding second RE subset, and a time-frequency resource occupied by the second RE subset is related to a time-frequency resource occupied by the first RE subset; if the first candidate resource is occupied by the second information, the first RE subset and the corresponding second RE subset are used to carry the outputs of two times of independent channel coding of the second information respectively, the number of REs included in the first RE subset is different from the number of REs included in the corresponding second RE subset, the first RE subset includes a positive integer number of REs, and the second RE subset includes a positive integer number of REs.

In one embodiment, the UE 450 includes a memory that stores a computer readable instruction program. The computer readable instruction program generates an action when executed by at least one processor. The action includes: receiving first information and monitoring second information. The first information is used for determining X1 candidate resources, the second information may occupy one of the X1 candidate resources, a first candidate resource is one of the X1 candidate resources, the first candidate resource includes a first RE subset and a corresponding second RE subset, and a time-frequency resource occupied by the second RE subset is related to a time-frequency resource occupied by the first RE subset; if the first candidate resource is occupied by the second information, the first RE subset and the corresponding second RE subset are used to carry the outputs of two times of independent channel coding of the second information respectively, the number of REs included in the first RE subset is different from the number of REs included in the corresponding second RE subset, the first RE subset includes a positive integer number of REs, and the second RE subset includes a positive integer number of REs.

In one embodiment, the gNB 410 includes at least one processor and at least one memory. The at least one memory includes computer program codes. The at least one memory and the computer program codes are configured to be used in collaboration with the at least one processor. The gNB 410 at least transmits first information and transmits second information, wherein the first information is used for determining X1 candidate resources, the second information occupies one of the X1 candidate resources, a first candidate resource is one of the X1 candidate resources, the first candidate resource includes a first RE subset and a corresponding second RE subset, and a time-frequency resource occupied by the second RE subset is related to a time-frequency resource occupied by the first RE subset; if the first candidate resource is occupied by the second information, the first RE subset and the corresponding second RE subset are used to carry the outputs of two times of independent channel coding of the second information respectively, the number of REs included in the first RE subset is different from the number of REs included in the corresponding second RE subset, the first RE subset includes a positive integer number of REs, and the second RE subset includes a positive integer number of REs.

In one embodiment, the gNB 410 includes a memory that stores a computer readable instruction program. The computer readable instruction program generates an action when executed by at least one processor. The action includes: transmitting first information and transmitting second information, wherein the first information is used for determining X1 candidate resources, the second information occupies one of the X1 candidate resources, a first candidate resource is one of the X1 candidate resources, the first candidate resource includes a first RE subset and a corresponding second RE subset, and a time-frequency resource occupied by the second RE subset is related to a time-frequency resource occupied by the first RE subset; if the first candidate resource is occupied by the second information, the first RE subset and the corresponding second RE subset are used to carry outputs of two times of independent channel coding of the second information respectively, the number of REs included in the first RE subset is different from the number of REs included in the corresponding second RE subset, the first RE subset includes a positive integer number of REs, and the second RE subset includes a positive integer number of REs.

In one embodiment, the UE 450 corresponds to the UE in the present disclosure.

In one embodiment, the gNB 410 corresponds to the base station in the present disclosure.

In one embodiment, at least one of the receiving processor 452 and the controller/processor 490 is used for monitoring the second information in the present disclosure.

In one embodiment, the controller/processor 490 is used for receiving the first information in the present disclosure.

Embodiment 5

Figure 5:
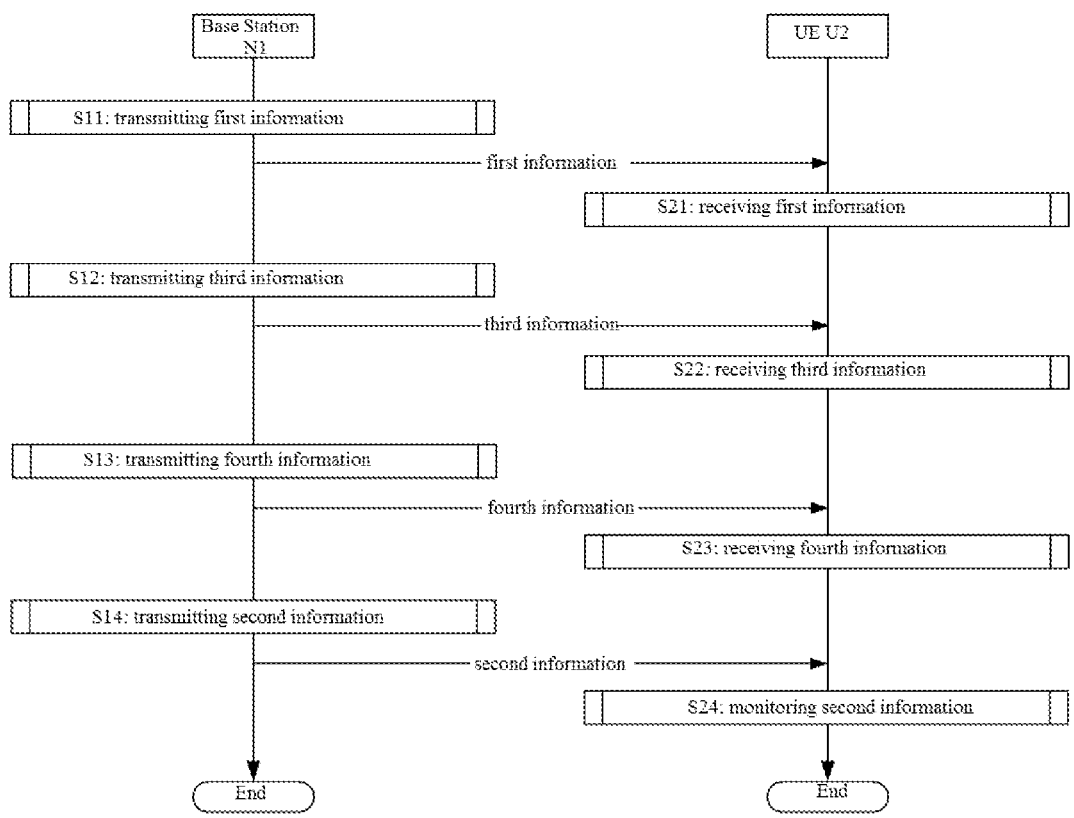
FIG. 5 is a flowchart illustrating the transmission of a radio signal according to one embodiment of the present disclosure.

Embodiment 5 illustrates an example of a flowchart of the transmission of a radio signal according to one embodiment of the present disclosure, as shown in FIG. 5. In FIG. 5, the base station N1 is a maintenance base station for a serving cell of the UE U2.

The base station N1 transmits first information in S11, transmits third information in S12, transmits fourth information in S13 and transmits second information in S14.

The UE U2 receives the first information in S21, receives the third information in S22, receives the fourth information in S23, and monitors the second information in S24.

In embodiment 5, the first information is used for determining X1 candidate resources, the second information occupies one of the X1 candidate resources, a first candidate resource is one of the X1 candidate resources, the first candidate resource includes a first RE subset and a corresponding second RE subset, and a time-frequency resource occupied by the second RE subset is related to a time-frequency resource occupied by the first RE subset; if the first candidate resource is occupied by the second information, the first RE subset and the corresponding second RE subset are used to carry the outputs of two times of independent channel coding of the second information respectively, the number of REs included in the first RE subset is different from the number of REs included in the corresponding second RE subset, the first RE subset includes a positive integer number of REs, and the second RE subset includes a positive integer number of REs; the third information indicates whether the monitor of the second information can assume that the second information is transmitted on both the first RE subset and the second RE subset; and the fourth information is used for determining the order in which the blind detections of the second information are performed on the first RE subset and the second RE subset.

In one embodiment, the monitor of the second information assumes that the second information is transmitted by a first antenna port group on the first RE subset, and the monitor of the second information assumes that the second information is transmitted by a second antenna port group on the second RE subset; the first antenna port group includes a positive integer number of antenna ports, and the second antenna port group includes a positive integer number of antenna ports; the first antenna port group and the second antenna port group are different.

In one embodiment, the first RE subset is one of the X1 candidate resources, the second RE subset is one of the X1 candidate resources, and there is no RE that belongs to both the first RE subset and the second RE subset.

In one embodiment, a first bit block is obtained as the bit sequence output of encoding the second information by polar coding with a mother code length of M, P1 consecutive bits in the first bit block occupy the first RE subset, a second bit block occupies the second RE subset, the second bit block is generated by concatenating P2 consecutive bits in the first bit block and the first bit block together, P1 is a positive integer not greater than M, and P2 is a non-negative positive integer less than M, and M is a positive integral power of 2.

In one embodiment, the third information is high-layer information.

In one embodiment, the third information is carried by an RRC signaling.

In one embodiment, the third information is one IE of the RRC signaling.

In one embodiment, the third information is physical layer information.

In one embodiment, the third information is transmitted through a DCI.

In one embodiment, the third information and the first information are two different IEs of one same RRC signaling.

In one embodiment, the fourth information is physical layer information.

In one embodiment, the fourth information is carried by an RRC signaling.

In one embodiment, the fourth information is one IE of the RRC signaling.

In one embodiment, the fourth information is physical layer information.

In one embodiment, the fourth information is transmitted through a DCI.

In one embodiment, the fourth information and the first information are two different IEs of one same RRC signaling.

In one embodiment, the fourth information and the third information are two different IEs of one same RRC signaling.

In one embodiment, the fourth information is used by the UE to determine the order in which blind detections of the second information are performed on the first RE subset and the second RE subset.

In one embodiment, the fourth information indicates the order in which blind detections of the second information are performed on the first RE subset and the second RE subset.

In one embodiment, the fourth information indicates that a blind detection of the second information is performed on the first RE subset preferentially.

In one embodiment, the fourth information indicates that a blind detection of the second information is performed on the second RE subset preferentially.

In one embodiment, the fourth information indicates that a joint blind detection of the second information is performed on the first RE subset and the second RE subset preferentially.

Embodiment 6

Figure 6:
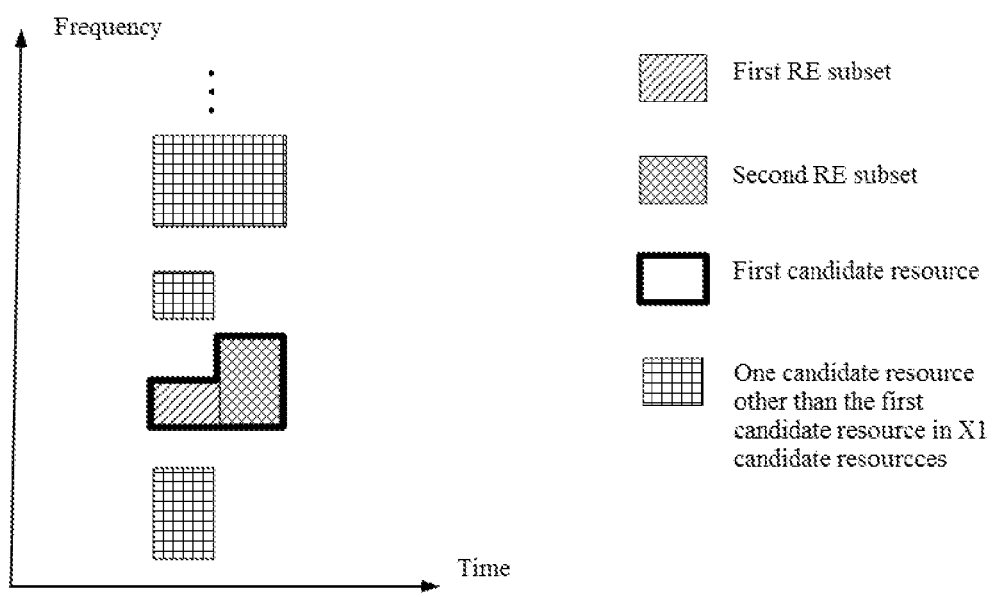
FIG. 6 is a diagram illustrating a relationship between a first RE subset and a second RE subset according to one embodiment of the present disclosure.

Embodiment 6 illustrates an example of a diagram of a relationship between a first RE subset and a second RE subset according to one embodiment of the present disclosure, as shown in FIG. 6. In FIG. 6, the horizontal axis represents time, the vertical axis represents frequency, the rectangle filled by slashes represents a first RE subset, the rectangle filled by cross lines represents a second RE subset, the polygon enclosed by a bold line represents a first candidate resource, each polygon filled by cross lines represents a candidate resource occupying a resource other than the first candidate resource in the X1 candidate resources.

In Embodiment 6, the first candidate resource is one of the X1 candidate resources, the first candidate resource includes a first RE subset and a corresponding second RE subset, and a time-frequency resource occupied by the second RE subset is related to a time-frequency resource occupied by the first RE subset; the number of REs included in the first RE subset is different from the number of REs included in the corresponding second RE subset, the first RE subset includes a positive integer number of REs, and the second RE subset includes a positive integer number of REs; the first RE subset is one of the X1 candidate resources, the second RE subset is one of the X1 candidate resources, and there is no RE that belongs to both the first RE subset and the second RE subset.

In one embodiment, the UE in the present disclosure performs a blind detection of the second information in the present disclosure on the first RE subset.

In one embodiment, the UE in the present disclosure performs a joint blind detection of the second information in the present disclosure on the first RE subset and the second RE subset.

In one embodiment, the UE in the present disclosure combines the output of channel coding of the second information carried on the first RE subset and the output of channel coding of the second information carried on the second RE subset, before performing a blind detection of the second information.

In one embodiment, the UE in the present disclosure combines the output of channel coding of the information carried on the first RE subset and the output of channel coding of the information carried on the second RE, before performing a blind detection of the second information.

Embodiment 7

Figure 7:
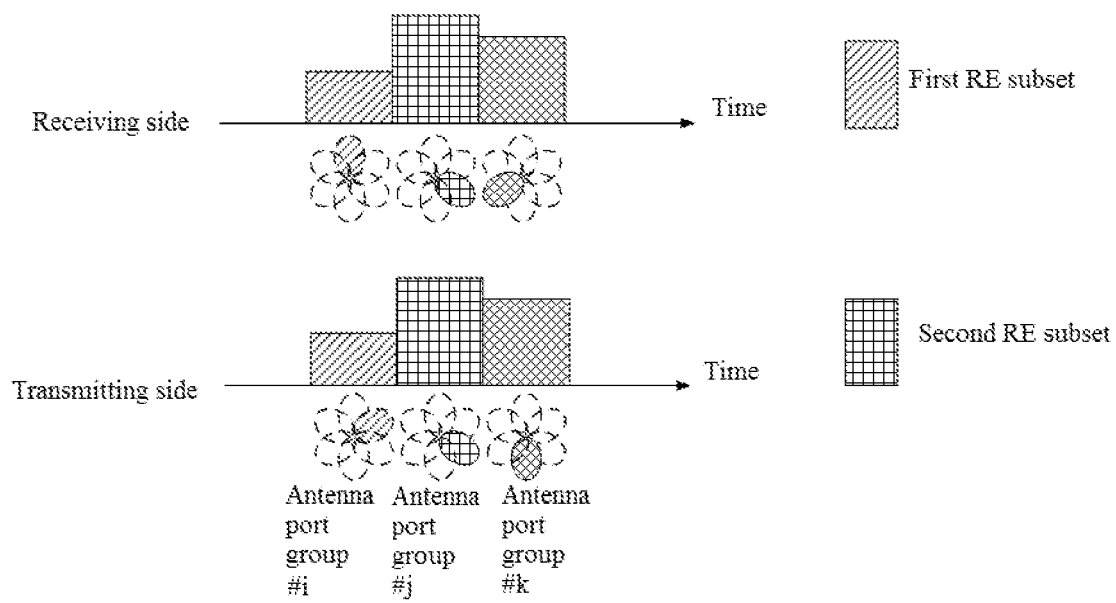
FIG. 7 is a diagram illustrating a relationship between a first antenna port group and a second antenna port group according to one embodiment of the present disclosure.

Embodiment 7 illustrates an example of a diagram of a relationship between a first antenna port group and a second antenna port group according to one embodiment of the present disclosure, as shown in FIG. 7. In FIG. 7, the horizontal axis represents time, the rectangle filled by slashes represents a first RE subset, the rectangle filled by cross lines represents a second RE subset, the above diagram represents a receiving side, the below diagram represents a transmitting side, each petal represents an antenna port group, the petal filled by lines at the receiving side represents a receiving antenna port group in a corresponding time period, and the petal filled by lines at the transmitting side represents a transmitting antenna port group in a corresponding time period.

In Embodiment 7, the monitor of the second information assumes that the second information is transmitted by a first antenna port group on the first RE subset, and the monitor of the second information assumes that the second information is transmitted by a second antenna port group on the second RE subset; the first antenna port group includes a positive integer number of antenna ports, and the second antenna port group includes a positive integer number of antenna ports; the first antenna port group and the second antenna port group are different.

In one embodiment, each of the antenna ports corresponds to an antenna beam.

In one embodiment, each of the antenna port groups corresponds to an antenna beam.

In one embodiment, the first antenna port group and the second antenna port group represent two different beams, respectively.

In one embodiment, the first antenna port group and the second antenna port group represent two different analog beams, respectively.

In one embodiment, the first antenna port group and the second antenna port group are Quasi-Co-Located (QCL) with two different Channel Status Information Reference Signal (CSI-RS) antenna ports, respectively.

In one embodiment, the first antenna port group and the second antenna port group are QCL with two CSI-RSs of different configurations, respectively.

In one embodiment, the first antenna port group and the second antenna port group include the same number of antenna ports.

In one embodiment, the first antenna port group and the second antenna port group include different numbers of antenna ports.

Embodiment 8

Figure 8:
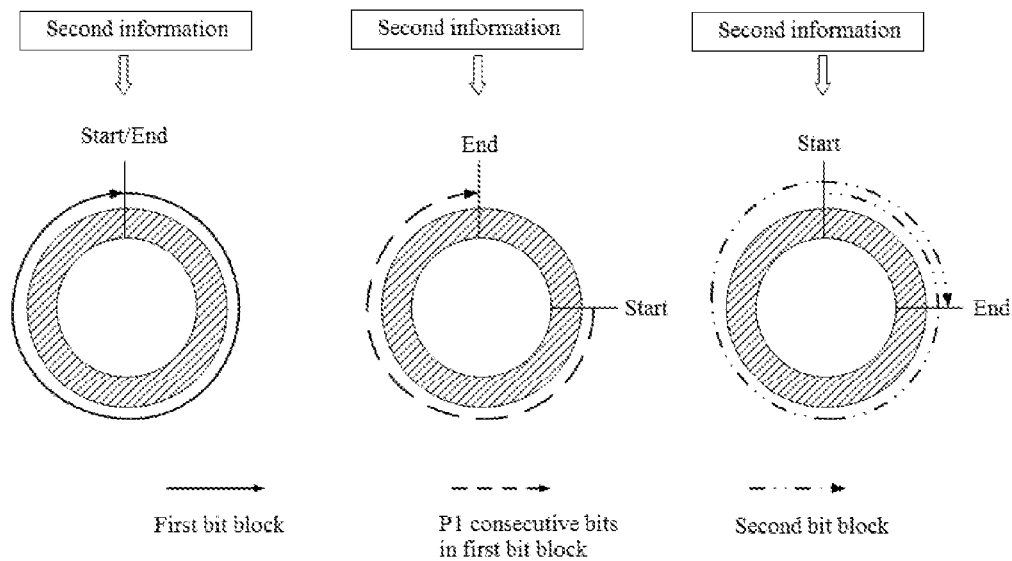
FIG. 8 is a diagram illustrating a relationship between a first bit block and a second bit block according to one embodiment of the present disclosure.

Embodiment 8 illustrates an example of a diagram of a relationship between a first bit block and a second bit block according to one embodiment of the present disclosure, as shown in FIG. 8. In FIG. 8, the ring filled by slashes represents a circular buffer, the circular buffer stores a bit sequence output of polar coding with a mother code length of M, the solid arrowed curve represents a first bit block read from the circular buffer, the even dashed arrowed curve represents P1 consecutive bits in the first bit block read from the circular buffer, the dot-dash arrowed curve represents a second bit block read from the circular buffer.

In embodiment 8, the first RE subset and the corresponding second RE subset are used to carry outputs of two independent channel coding of the second information respectively, a first bit block is obtained as the bit sequence output of encoding the second information by polar coding with a mother code length of M, P1 consecutive bits in the first bit block occupy the first RE subset, a second bit block occupies the second RE subset, the second bit block is generated by concatenating P2 consecutive bits in the first bit block and the first bit lock together, P1 is a positive integer not greater than M, and P2 is a non-negative positive integer less than M, and M is a positive integral power of 2.

In one embodiment, different DCI transmission rates are realized in the first RE subset and the second RE subset through repetition, puncturing or shortening when the rates are matched, while the mother code length keeps unchanged. Thus soft combing before channel decoding can be supported, and the link performance of the DCI transmission can be improved.

In one embodiment, if P1 is equal to M, P2 is greater than 0.

In one embodiment, the first bit block consists of M bits.

In one embodiment, if P1 is less than M, P2 is equal to 0.

In one embodiment, if P1 is less than M, P2 is greater than 0.

In one embodiment, the second bit block consists of M plus P2 bits.

In one embodiment, the P1 consecutive bits are obtained by puncturing the first bit block.

In one embodiment, the P1 consecutive bits are obtained by shortening the first bit block.

In one embodiment, the P1 consecutive bits are P1 beginning bits in the first bit block.

In one embodiment, the P1 consecutive bits are P1 ending bits in the first bit block.

In one embodiment, the P2 consecutive bits are concatenated to the rear of the first bit block to generate the second bit block.

In one embodiment, the P2 consecutive bits are concatenated to the front of the first bit block to generate the second bit block.

Embodiment 9

Figure 9:
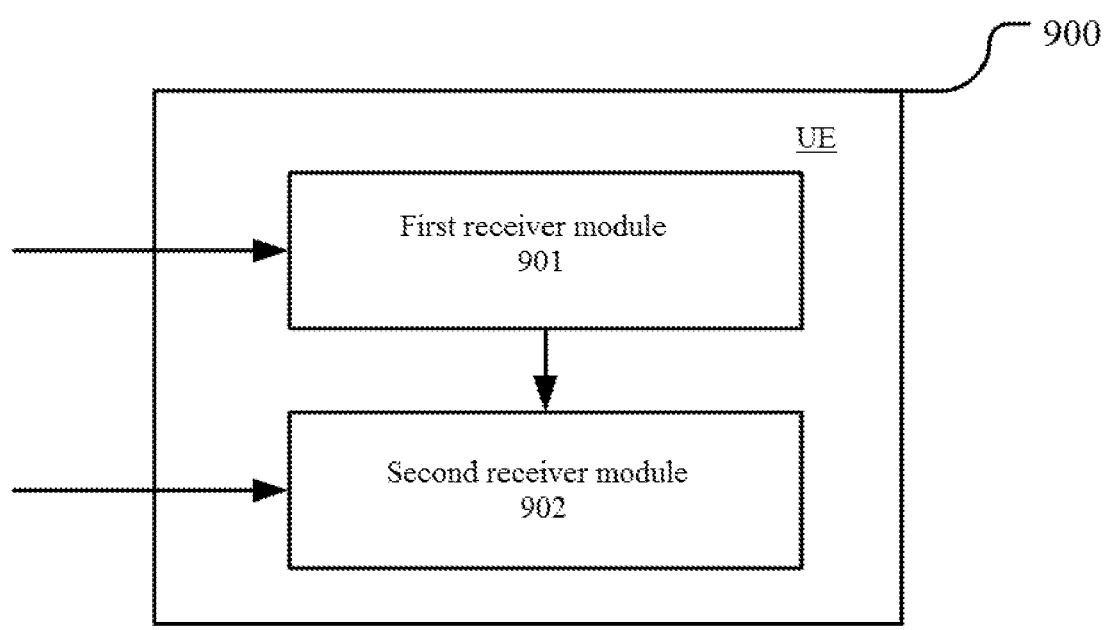
FIG. 9 is a structure block diagram illustrating a processing device in a UE according to one embodiment of the present disclosure.

Embodiment 9 illustrates an example of a structure block diagram for a processing device in a UE, as shown in FIG. 9. In FIG. 9, the UE processing device 900 is mainly composed of a first receiver module 901 and a second receiver module 902. The first receiver module 901 includes the transmitter/receiver 456 (including antenna 460), the receiving processor 452 and the controller/processor 490 shown in FIG. 4. The second receiver module 902 includes the transmitter/receiver 456 (including antenna 460), the receiving processor 452 and the controller/processor 490 shown in FIG. 4.

In Embodiment 9, the first receiver module 902 receives first information, and the second receiver module 902 monitors second information, wherein the first information is used for determining X1 candidate resources, the second information may occupy one of the X1 candidate resources, a first candidate resource is one of the X1 candidate resources, the first candidate resource includes a first RE subset and a corresponding second RE subset, and a time-frequency resource occupied by the second RE subset is related to a time-frequency resource occupied by the first RE subset; if the first candidate resource is occupied by the second information, the first RE subset and the corresponding second RE subset are used to carry the outputs of two times of independent channel coding of the second information respectively, the number of REs included in the first RE subset is different from the number of REs included in the corresponding second RE subset, the first RE subset includes a positive integer number of REs, and the second RE subset includes a positive integer number of REs.

In one embodiment, the monitor of the second information assumes that the second information is transmitted by a first antenna port group on the first RE subset, and the monitor of the second information assumes that the second information is transmitted by a second antenna port group on the second RE subset; the first antenna port group includes a positive integer number of antenna ports, and the second antenna port group includes a positive integer number of antenna ports; the first antenna port group and the second antenna port group are different.

In one embodiment, the first RE subset is one of the X1 candidate resources, the second RE subset is one of the X1 candidate resources, and there is no RE that belongs to both the first RE subset and the second RE subset.

In one embodiment, the first receiver module 901 further receives third information, wherein the third information indicates whether the monitor of the second information can assume that the second information is transmitted on both the first RE subset and the second RE subset.

In one embodiment, the first receiver module 901 further receives fourth information, wherein the fourth information is used for determining the order in which blind detections of the second information are performed on the first RE subset and the second RE subset.

In one embodiment, a first bit block is obtained as the bit sequence output of encoding the second information by polar coding with a mother code length of M, P1 consecutive bits in the first bit block occupy the first RE subset, a second bit block occupies the second RE subset, the second bit block is generated by concatenating P2 consecutive bits in the first bit block and the first bit lock together, P1 is a positive integer not greater than M, and P2 is a non-negative positive integer less than M, and M is a positive integral power of 2.

Embodiment 10

Figure 10:
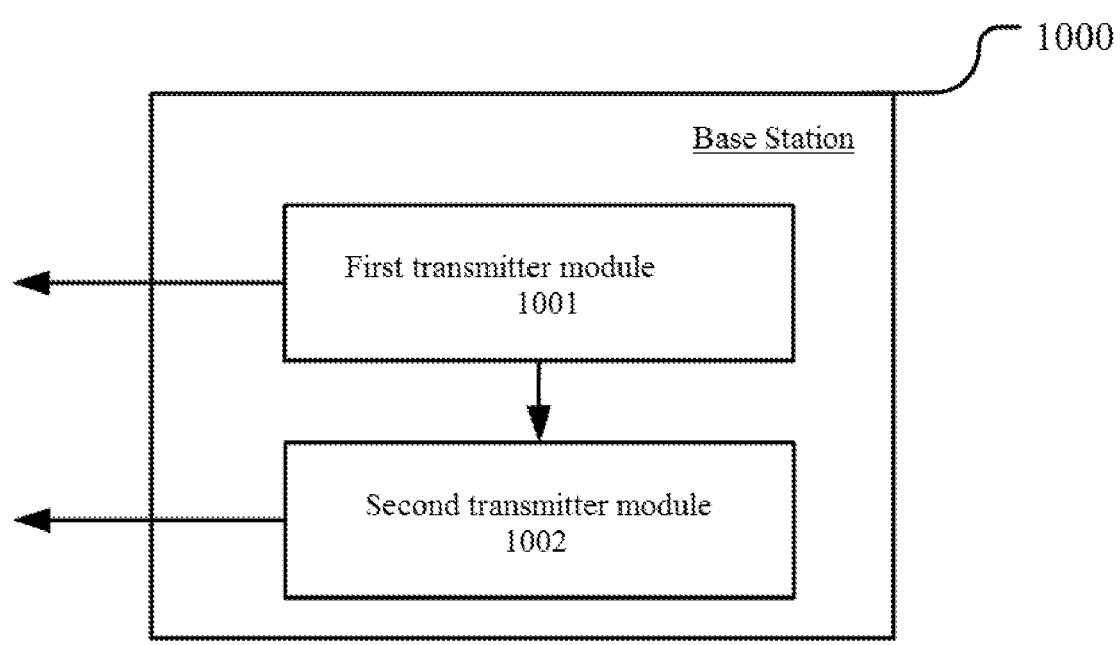
FIG. 10 is a structure block diagram illustrating a processing device in a base station according to one embodiment of the present disclosure.

Embodiment 10 illustrates an example of a structure block diagram for a processing device in a base station device, as shown in FIG. 10. In FIG. 10, the base station processing device 1000 is mainly composed of a first transmitter module 1001 and a second transmitter module 1002. The first transmitter module 1001 includes the transmitter/receiver 416 (including antenna 420), the transmitting processor 415 and the controller/processor 440 shown in FIG. 4. The second transmitter module 1002 includes the transmitter/receiver 416 (including antenna 420), the transmitting processor 415 and the controller/processor 440 shown in FIG. 4.

In Embodiment 10, the first transmitter module 1001 transmits first information, and the second transmitter module 1002 transmits second information, wherein the first information is used for determining X1 candidate resources, the second information occupies one of the X1 candidate resources, a first candidate resource is one of the X1 candidate resources, the first candidate resource includes a first RE subset and a corresponding second RE subset, and a time-frequency resource occupied by the second RE subset is related to a time-frequency resource occupied by the first RE subset; if the first candidate resource is occupied by the second information, the first RE subset and the corresponding second RE subset are used to carry the outputs of two times of independent channel coding of the second information respectively, the number of REs included in the first RE subset is different from the number of REs included in the corresponding second RE subset, the first RE subset includes a positive integer number of REs, and the second RE subset includes a positive integer number of REs.

In one embodiment, the monitor of the second information assumes that the second information is transmitted by a first antenna port group on the first RE subset, and the monitor of the second information assumes that the second information is transmitted by a second antenna port group on the second RE subset; the first antenna port group includes a positive integer number of antenna ports, and the second antenna port group includes a positive integer number of antenna ports; the first antenna port group and the second antenna port group are different.

In one embodiment, the first RE subset is one of the X1 candidate resources, the second RE subset is one of the X1 candidate resources, and there is no RE that belongs to both the first RE subset and the second RE subset.

In one embodiment, the first transmitter module 1001 further transmits third information, wherein the third information indicates whether the monitor of the second information can assume that the second information is transmitted on both the first RE subset and the second RE subset.

In one embodiment, the first transmitter module 1001 further transmits fourth information, wherein the fourth information is used for determining the order in which blind detections of the second information are performed on the first RE subset and the second RE subset.

In one embodiment, a first bit block is obtained as the bit sequence output of encoding the second information by polar coding with a mother code length of M, P1 consecutive bits in the first bit block occupy the first RE subset, a second bit block occupies the second RE subset, the second bit block is generated by concatenating P2 consecutive bits in the first bit block and the first bit lock together, P1 is a positive integer not greater than M, and P2 is a non-negative positive integer less than M, and M is a positive integral power of 2.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal in the present disclosure includes but not limited to mobile phones, tablet computers, notebooks, network cards, low-power equipment, enhanced MTC (eMTC) equipment, NB-IoT equipment, vehicle-mounted communication equipment, and other wireless communication equipment. The base station in the present application includes but not limited to macro-cellular base stations, micro-cellular base stations, home base stations, relay base station, eNB, gNB, TRP, and other wireless communication equipment.

The above are merely the embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
   receiving first information; and
   monitoring second information;
   wherein the first information is used for determining X1 candidate resources, the second information potentially occupies one of the X1 candidate resources, a first candidate resource is one of the X1 candidate resources, the first candidate resource comprises a first Resource Element (RE) subset and a corresponding second RE subset, and a time-frequency resource occupied by the second RE subset is related to a time-frequency resource occupied by the first RE subset; when the first candidate resource is occupied by the second information, the first RE subset and the corresponding second RE subset are used to carry the outputs of two times of independent channel coding of the second information respectively, the number of REs comprised in the first RE subset is different from the number of REs comprised in the corresponding second RE subset, the first RE subset comprises a positive integer number of REs, and the second RE subset comprises a positive integer number of REs.

2. The method according to claim 1, wherein the monitor of the second information assumes that the second information is transmitted by a first antenna port group on the first RE subset, and the monitor of the second information assumes that the second information is transmitted by a second antenna port group on the second RE subset; the first antenna port group comprises a positive integer number of antenna ports, and the second antenna port group comprises a positive integer number of antenna ports; the first antenna port group and the second antenna port group are different.

3. The method according to claim 1, wherein the first RE subset is one of the X1 candidate resources, the second RE subset is one of the X1 candidate resources, and there is no RE that belongs to both the first RE subset and the second RE subset.

4. The method according to claim 1, comprising:
   receiving third information;
   wherein the third information indicates whether the monitor of the second information can assume that the second information is transmitted on both the first RE subset and the second RE subset.

5. The method according to claim 1, comprising:
   receiving fourth information;
   wherein the fourth information is used for determining the order in which blind detections of the second information are performed on the first RE subset and the second RE subset.

6. The method according to claim 1, wherein a first bit block is obtained as the bit sequence output of encoding the second information by polar coding with the mother code length of M, PI consecutive bits in the first bit block occupy the first RE subset, a second bit block occupies the second RE subset, the second bit block is generated by concatenating P2 consecutive bits in the first bit block and the first bit block together, PI is a positive integer not greater than M, and P2 is a non-negative positive integer less than M, and M is a positive integral power of 2.

7. A method in a base station device for wireless communication, comprising:
   transmitting first information; and
   transmitting second information;
   wherein the first information is used for determining X1 candidate resources, the second information potentially occupies one of the X1 candidate resources, a first candidate resource is one of the X1 candidate resources, the first candidate resource comprises a first RE subset and a corresponding second RE subset, and a time-frequency resource occupied by the second RE subset is related to a time-frequency resource occupied by the first RE subset; when the first candidate resource is occupied by the second information, the first RE subset and the corresponding second RE subset are used to carry the outputs of two times of independent channel coding of the second information respectively, the number of REs comprised in the first RE subset is different from the number of REs comprised in the corresponding second RE subset, the first RE subset comprises a positive integer number of REs, and the second RE subset comprises a positive integer number of REs.

8. The method according to claim 7, wherein the monitor of the second information assumes that the second information is transmitted by a first antenna port group on the first RE subset, and the monitor of the second information assumes that the second information is transmitted by a second antenna port group on the second RE subset; the first antenna port group comprises a positive integer number of antenna ports, and the second antenna port group comprises a positive integer number of antenna ports; the first antenna port group and the second antenna port group are different.

9. The method according to claim 7, wherein the first RE subset is one of the X1 candidate resources, the second RE subset is one of the X1 candidate resources, and there is no RE that belongs to both the first RE subset and the second RE subset.

10. The method according to claim 7, further comprising:
   transmitting third information;
   wherein the third information indicates whether the monitor of the second information can assume that the second information is transmitted on both the first RE subset and the second RE subset.

11. The method according to claim 7, further comprising:
   transmitting fourth information;
   wherein the fourth information is used for determining the order in which blind detections of the second information are performed on the first RE subset and the second RE subset.

12. The method according to claim 7, wherein a first bit block is obtained as the bit sequence output of encoding the second information by polar coding with the mother code length of M, PI consecutive bits in the first bit block occupy the first RE subset, a second bit block occupies the second RE subset, the second bit block is generated by concatenating P2 consecutive bits in the first bit block and the first bit block together, PI is a positive integer not greater than M, and P2 is a non-negative positive integer less than M, and M is a positive integral power of 2.

13. A User Equipment (UE) for wireless communication, comprising:
   a first receiver module, to receive first information; and
   a second receiver module, to monitor second information;
   wherein the first information is used for determining X1 candidate resources, the second information potentially occupies one of the X1 candidate resources, a first candidate resource is one of the X1 candidate resources, the first candidate resource comprises a first RE subset and a corresponding second RE subset, and a time-frequency resource occupied by the second RE subset is related to a time-frequency resource occupied by the first RE subset; when the first candidate resource is occupied by the second information, the first RE subset and the corresponding second RE subset are used to carry the outputs of two times of independent channel coding of the second information respectively, the number of REs comprised in the first RE subset is different from the number of REs comprised in the corresponding second RE subset, the first RE subset comprises a positive integer number of REs, and the second RE subset comprises a positive integer number of REs.

14. The UE according to claim 13, wherein the monitor of the second information assumes that the second information is transmitted by a first antenna port group on the first RE subset, and the monitor of the second information assumes that the second information is transmitted by a second antenna port group on the second RE subset; the first antenna port group comprises a positive integer number of antenna ports, and the second antenna port group comprises a positive integer number of antenna ports; the first antenna port group and the second antenna port group are different.

15. The UE according to claim 13, wherein the first receiver module further receives third information, wherein the third information indicates whether the monitor of the second information can assume that the second information is transmitted on both the first RE subset and the second RE subset.

16. The UE according to claim 13, wherein the first receiver module further receives fourth information, wherein the fourth information is used for determining the order in which blind detections of the second information are performed on the first RE subset and the second RE subset.

17. A base station device for wireless communication, comprising:
   a first transmitter module, to transmit first information; and
   a second transmitter module, to transmit second information;
   wherein the first information is used for determining X1 candidate resources, the second information potentially occupies one of the X1 candidate resources, a first candidate resource is one of the X1 candidate resources, the first candidate resource comprises a first RE subset and a corresponding second RE subset, and a time-frequency resource occupied by the second RE subset is related to a time-frequency resource occupied by the first RE subset; when the first candidate resource is occupied by the second information, the first RE subset and the corresponding second RE subset are used to carry the outputs of two times of independent channel coding of the second information respectively, the number of REs comprised in the first RE subset is different from the number of REs comprised in the corresponding second RE subset, the first RE subset comprises a positive integer number of REs, and the second RE subset comprises a positive integer number of REs.

18. The base station device according to claim 17, wherein the monitor of the second information assumes that the second information is transmitted by a first antenna port group on the first RE subset, and the monitor of the second information assumes that the second information is transmitted by a second antenna port group on the second RE subset; the first antenna port group comprises a positive integer number of antenna ports, and the second antenna port group comprises a positive integer number of antenna ports; the first antenna port group and the second antenna port group are different.

19. The base station device according to claim 17, wherein the first transmitter module further transmits third information, wherein the third information indicates whether the monitor of the second information can assume that the second information is transmitted on both the first RE subset and the second RE subset.

20. The base station device according to claim 17, wherein the first transmitter module further transmits fourth information, wherein the fourth information is used for determining the order in which blind detections of the second information are performed on the first RE subset and the second RE subset.

* * * * *